(12) United States Patent
Mori

(10) Patent No.: US 12,037,070 B2
(45) Date of Patent: Jul. 16, 2024

(54) FOLDABLE VEHICLE

(71) Applicant: Striemo Inc., Tokyo (JP)

(72) Inventor: Yotaro Mori, Tokyo (JP)

(73) Assignee: Striemo Inc., Tokyo (JP)

( * ) Notice: Subject to any disclaimer, the term of this patent is extended or adjusted under 35 U.S.C. 154(b) by 0 days.

(21) Appl. No.: 18/032,927

(22) PCT Filed: Oct. 13, 2021

(86) PCT No.: PCT/JP2021/037877
§ 371 (c)(1),
(2) Date: Apr. 20, 2023

(87) PCT Pub. No.: WO2022/091785
PCT Pub. Date: May 5, 2022

(65) Prior Publication Data
US 2023/0391416 A1   Dec. 7, 2023

(30) Foreign Application Priority Data

Oct. 27, 2020   (JP) ................................ 2020-179805

(51) Int. Cl.
*B62K 15/00* (2006.01)
*B62H 1/00* (2006.01)
(Continued)

(52) U.S. Cl.
CPC ............. *B62K 15/006* (2013.01); *B62H 1/00* (2013.01); *B62J 43/13* (2020.02); *B62K 5/027* (2013.01); *B62K 5/06* (2013.01); *B62K 2202/00* (2013.01)

(58) Field of Classification Search
CPC .............. B62K 2015/005; B62K 15/00; B62K 15/006; B62K 5/02; B62K 5/027;
(Continued)

(56) References Cited

U.S. PATENT DOCUMENTS 3,905,618 A * 9/1975 Miranda .............. B62K 15/008
D12/112
4,026,573 A * 5/1977 Richardson ............ B62K 11/02
280/278

(Continued)

FOREIGN PATENT DOCUMENTS

| JP | 3045765 U | 2/1998 |
| JP | 2004209037 A | 7/2004 |

(Continued)

OTHER PUBLICATIONS

International Search Report; Application PCT/JP2021/037877; Dec. 28, 2021.

*Primary Examiner* — Laura Freedman
(74) *Attorney, Agent, or Firm* — Duft & Bornsen, PC

(57) ABSTRACT

A vehicle including a first frame extending in a front-rear direction from a front wheel to a rear wheel, a second frame, a steering part supported by the second frame, a support portion movably supporting the steering part about a pivot axis so that the steering part is positioned above the front wheel when the vehicle is in a traveling posture and is positioned above the rear wheel when the vehicle is in a folded posture, and a movement restriction portion provided near the rear wheel so as to restrict a movement of the steering part toward the rear wheel when the posture of the vehicle changes from the traveling posture to the folded posture.

8 Claims, 10 Drawing Sheets

(51) Int. Cl.
*B62J 43/13* (2020.01)
*B62K 5/027* (2013.01)
*B62K 5/06* (2006.01)

(58) Field of Classification Search
CPC ........ B62K 5/06; B62K 5/10; B62K 2202/00; B62H 1/00; B62J 43/13; B62J 50/10; B62J 15/00
See application file for complete search history.

(56) References Cited

U.S. PATENT DOCUMENTS

| | | | | |
|---|---|---|---|---|
| 4,611,818 | A * | 9/1986 | Cammarata | B62K 15/006 280/278 |
| 4,666,018 | A * | 5/1987 | Shibuya | B60G 11/225 180/213 |
| 5,240,267 | A * | 8/1993 | Owsen | B62K 5/02 280/282 |
| 5,337,609 | A * | 8/1994 | Hsu | B62K 21/24 280/278 |
| 5,906,452 | A * | 5/1999 | Lee | B62K 15/006 403/325 |
| 5,927,733 | A * | 7/1999 | Banda | B62K 21/18 188/19 |
| 6,158,751 | A * | 12/2000 | Wu | B62K 3/002 280/87.041 |
| 6,481,729 | B2 * | 11/2002 | Herman | B62K 3/002 280/87.041 |
| 6,623,023 | B2 * | 9/2003 | Niitsu | B62K 15/008 280/278 |
| 7,654,356 | B2 * | 2/2010 | Wu | B62K 15/008 296/181.7 |
| 8,500,147 | B2 * | 8/2013 | Johnson | B62K 3/002 280/87.041 |
| 11,214,326 | B2 * | 1/2022 | Kong | B62K 5/02 |
| 2015/0210340 | A1 * | 7/2015 | Wang | B62K 15/006 280/278 |
| 2022/0017121 | A1 * | 1/2022 | McLean | B60W 50/14 |
| 2023/0202611 | A1 * | 6/2023 | Mori | B62K 5/10 180/216 |
| 2023/0348011 | A1 * | 11/2023 | Mori | B62J 1/08 |

FOREIGN PATENT DOCUMENTS

| | | | | |
|---|---|---|---|---|
| JP | 3182853 U | | 4/2013 | |
| JP | 3196617 U | | 3/2015 | |
| JP | 2019059445 A | | 4/2019 | |
| JP | 2022053807 A | * | 4/2022 | |
| JP | 2022070637 A | * | 5/2022 | |
| JP | 2022070638 A | * | 5/2022 | |
| JP | 2022140080 A | * | 9/2022 | |
| WO | WO-2022191115 A1 | * | 9/2022 | ............ A63C 17/01 |
| WO | WO-2022191117 A1 | * | 9/2022 | ............ B62J 43/10 |

* cited by examiner

_US 12,037,070 B2_

FOLDABLE VEHICLE

CROSS-REFERENCE TO RELATED APPLICATION

This application is a National Stage of PCT international application Ser. No. PCT/JP2021/037877 filed on Oct. 13, 2021 which designates the United States, incorporated herein by reference, and which is based upon and claims the benefit of priority from Japanese Patent Application No. 2020-179805, filed on Oct. 27, 2020, the entire contents of which are incorporated herein by reference.

TECHNICAL FIELD

This invention relates to a foldable vehicle including a front wheel and a rear wheel.

BACKGROUND ART

As this type of vehicle, conventionally, there is a known electrically powered three-wheeled vehicle having a single wheel disposed on one side of front and rear and a pair of left and right wheels disposed on the other side of front and rear (for example, see Patent Literature 1). In the vehicle described in Patent Literature 1, a handle support portion for supporting a handle is rotatably provided at a pair of left and right support portions for supporting a pair of left and right wheels, and the handle support portion is inserted between the pair of left and right support portions so that the vehicle becomes a folded posture.

CITATION LIST

Patent Literature

Patent Literature 1: Japanese Unexamined Patent Publication No. 2019-59445

DISCLOSURE OF INVENTION

Problems to be Solved by the Invention

However, in the vehicle described in Patent Literature 1, in the folded posture or during folding operation, a handle or hand may come into contact with the pair of left and right wheels, posing a risk of getting the handle or hand dirty.

Means for Solving Problem

An aspect of the present invention is a vehicle configured to be capable of changing a posture between a traveling posture and a folded posture obtained by folding from the traveling posture, including: a front wheel; a rear wheel; a first frame extending in a front-rear direction from the front wheel to the rear wheel; a second frame; a steering part supported by the second frame; a support portion configured to movably support the steering part about a pivot axis so that the steering part is positioned above the front wheel when the vehicle is in the traveling posture and the steering part is positioned above the rear wheel when the vehicle is in the folded posture; and a movement restriction portion provided near the rear wheel so as to restrict a movement of the steering part toward the rear wheel when the posture of the vehicle changes from the traveling posture to the folded posture.

Effect of the Invention

According to the present invention, it is possible to prevent a handle or hand from coming into contact with a rear wheel and becoming dirty during a folded posture of a vehicle or during a folding operation.

DESCRIPTION OF EMBODIMENT

Now, an embodiment of the present invention will be described with reference to FIGS. 1 to 10. A vehicle according to the embodiment of the present invention is a three-wheeled vehicle including a single front wheel and a pair of left and right rear wheels, and is formed such that a user can ride in a standing posture.

Figure 1A:
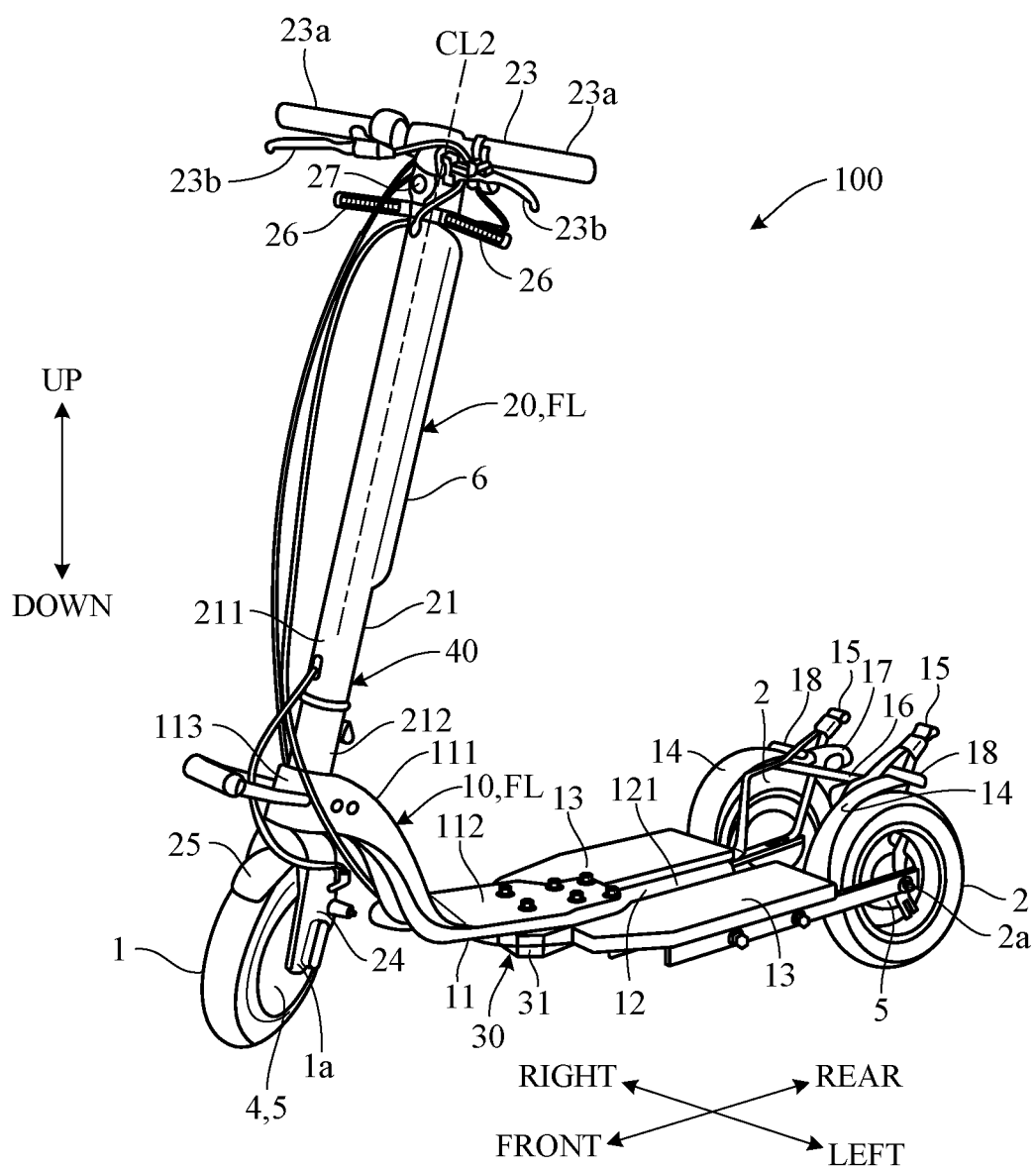
FIG. 1A is a perspective view illustrating an overall configuration of a vehicle according to an embodiment of the present invention, and a view of the vehicle from a left front diagonal direction.
Figure 1B:
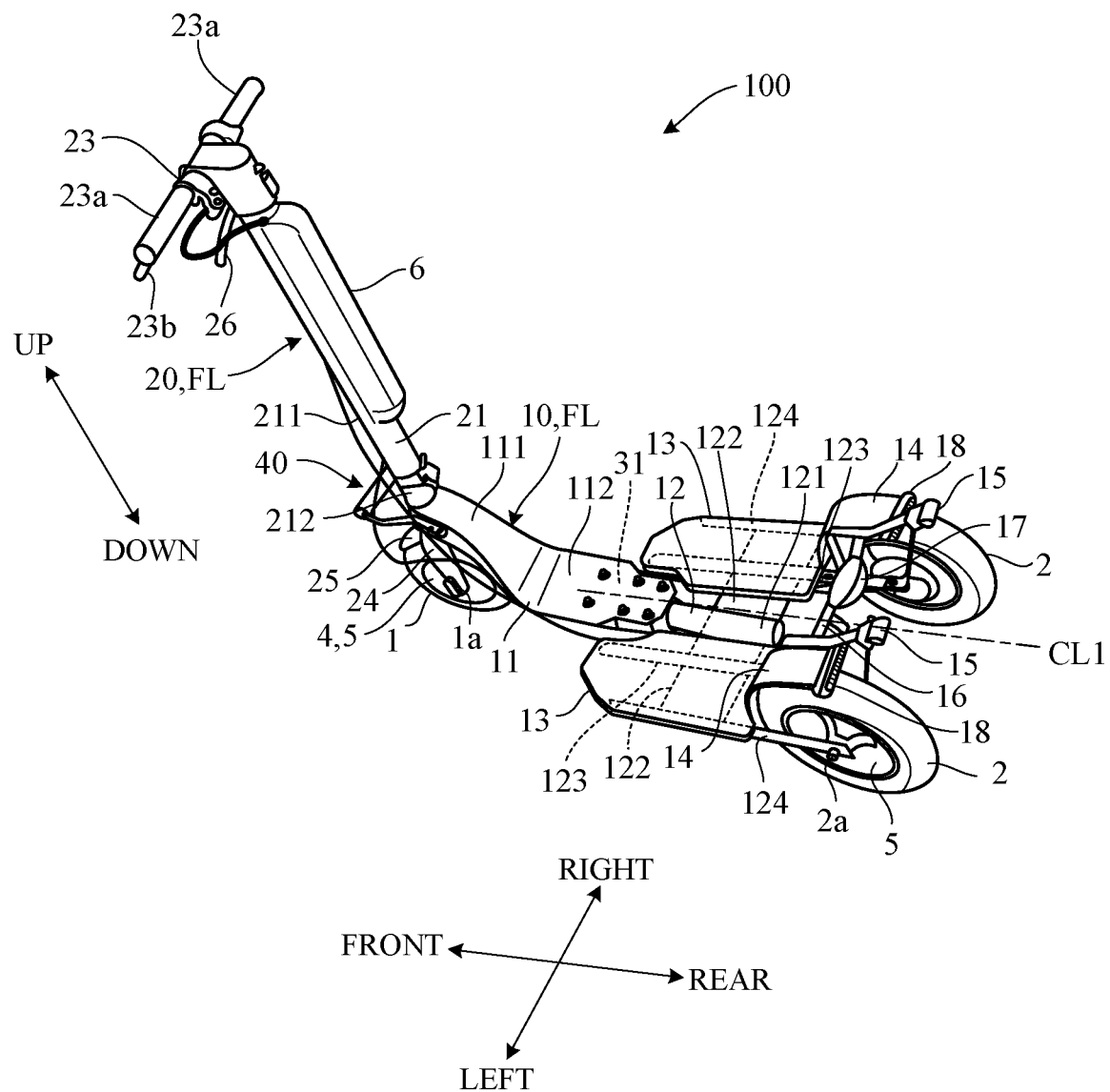
FIG. 1B is a perspective view illustrating an overall configuration of the vehicle according to the embodiment of the present invention, and a view of the vehicle from a left rear diagonal direction.

FIG. 1A and FIG. 1B are perspective views illustrating an overall configuration of a vehicle 100 according to the embodiment of the present invention, and show a traveling posture of the vehicle 100 when using the vehicle, respectively. Hereinafter, the front-rear direction (length direction), the left-right direction (width direction), and the up-down direction (height direction) of the vehicle 100 are defined as illustrated, and a configuration of each unit will be described according to this definition. FIG. 1A is a view of the vehicle 100 from the left front diagonal direction, and FIG. 1B is a view of the vehicle 100 from the left rear diagonal direction.

As illustrated in FIGS. 1A and 1B, the vehicle 100 includes a front wheel 1 and rear wheels 2, and a frame FL included in a skeleton of the vehicle 100, and is entirely symmetric with respect to a center line CL1 (FIG. 1B)

passing through the center of the vehicle 100 in the left-right direction. More specifically, the front wheel 1 is arranged along the center line CL1, and the left and right rear wheels 2 are arranged at symmetrical positions across the center line CL1. The front wheel 1 has the same diameter as the rear wheels 2. The front wheel 1 may have a larger diameter or smaller diameter than the rear wheels 2. The frame FL includes a main frame 10 extending from the front wheel 1 to the rear wheels 2 and a vertical frame 20 erected above the front wheel 1.

The main frame 10 includes a front frame 11 extending rearward from above the front wheel 1, and a rear frame 12 continuous with the front frame 11 and extending over the rear wheels 2. The front frame 11 includes an arc portion 111 and a flat plate portion 112. The arc portion 111 is formed in a substantially arc shape from above to behind the front wheel 1 along an outer peripheral surface of the front wheel 1 and has a wider width in the left-right direction than the front wheel 1. The flat plate portion 112 extends rearward substantially horizontally (strictly, inclined with a gentle downward gradient toward the rear side) from a rear end portion of the arc portion 111. At a front end portion of the arc portion 111, a substantially cylindrical pipe support portion 113 is provided so as to penetrate the front end portion in the up-down direction.

The vertical frame 20 has a substantially cylindrical vertical pipe 21 extending obliquely along an axis CL2 (FIG. 1A) such that an upper end portion is positioned rearward of a lower end portion. The vertical pipe 21 passes through the pipe support portion 113, and is rotatably supported by a front end portion of the main frame 10 about the axis CL2. A handlebar 23 is attached to an upper end portion of the vertical pipe 21, and a front fork 24 is fixed to a lower end portion.

A rotary shaft 1a of the front wheel 1 is rotatably supported by a pair of left and right front forks 24. The front wheel 1 is steered by a turning operation (steering) of the handlebar 23. The handlebar 23 is a bar handle extending substantially linearly in the left-right direction, and grips 23a made of resin or rubber to be gripped by a user are provided at both left and right end portions of the handlebar 23. Inside the pair of left and right front forks 24, a substantially arc-shaped front fender (also simply referred to as a fender) 25 is disposed from above to behind the front wheel 1 so as to cover a periphery of the front wheel 1. The fender 25 is supported by the lower end portion of the vertical pipe 21 or the front fork 24.

Although not illustrated in detail, a traveling motor 4 (in-wheel motor) and a brake unit 5 are housed inside the front wheel 1. For example, the traveling motor 4 is disposed on the left side, and the brake unit 5 is disposed on the right part. The vehicle 100 is configured as an electric vehicle that travels by driving of the traveling motor 4. The brake unit 5 is configured as, for example, a drum brake unit constituting a drum brake. The rear wheel 2 is similarly provided with the brake unit 5. These brake units are operated by an operation of brake levers 23b provided in front of the grips 23a of the handlebar 23, and thus a braking force is applied to the front wheel 1 and the rear wheels 2. The traveling motor 4 as an electric motor may be provided in the rear wheel 2 instead of the front wheel 1, or in both the front wheel 1 and the rear wheel 2. Thus, the towing ability and the climbing ability of the vehicle 100 can be improved.

On a rear surface of the vertical pipe 21, a vertically long battery 6 is supported via a holder. The battery 6 is a secondary battery such as a lithium ion battery in which electric power supplied to the traveling motor 4 is stored, and the battery 6 is connected to the traveling motor 4 via a power line passing through the vertical frame 20. Electric power supplied from the battery 6 to the traveling motor 4 is controlled by a power control unit (not illustrated). The battery 6 may be disposed inside the vertical pipe 21, or may be disposed around other structural members such as the main frame 10.

Although not illustrated, the handlebar 23 is provided with a starter switch to instruct on/off of a main power supply, a blinker switch to notify of right/left turning, an accelerator lever to input a traveling command, and the like so as to be operable by the user. A display unit that displays vehicle information such as a remaining battery capacity and a set vehicle speed can also be provided. Below the handlebar 23, a pair of left and right blinker lamps 26 that blink in response to an operation of the blinker switch is provided. A headlight 27 is provided at the upper end portion of the vertical pipe 21.

As illustrated in FIG. 1B, the rear frame 12 includes a central frame 121 having a substantially cylindrical shape and a pair of left and right support frames 122 having a substantially plate shape. The central frame 121 extends in substantially parallel with the flat plate portion 112, i.e., extending in the front-rear direction with the front inclined slightly upward. The pair of left and right support frames 122 are respectively joined to left and right side surfaces of the central frame 121, and extend substantially horizontally in the left-right direction. To upper surfaces of the left and right support frames 122, a pair of left and right side frames extending in the front-rear direction are joined, more specifically, an inner side frame 123 on an inner side in a vehicle width direction and an outer side frame 124 on an outer side in the vehicle width direction are joined.

The right rear wheel 2 is disposed between the right inner side frame 123 and the right outer side frame 124, and a rotary shaft 2a of the right rear wheel 2 is rotatably supported by these side frames 123 and 124. Similarly, the left rear wheel 2 is disposed between the left inner side frame 123 and the left outer side frame 124, and the rotary shaft 2a of the left rear wheel 2 is rotatably supported by these side frames 123 and 124.

Steps (footrests) 13, which are plate members extending in the front-rear direction and the left-right direction and having a substantially rectangular shape in plan view, are individually disposed on the left and right sides of the central frame 121. The left and right steps 13 are individually disposed on the side frames 123 and 124 and supported by the side frames 123 and 124. The left and right steps 13 constitute a placement portion on which a user PS in a standing posture places both feet, and an upper surface (placement surface) of the step 13 is configured as a horizontal plane parallel to a road surface. In the step 13, a length in the front-rear direction and a width in the left-right direction are defined so that the entire sole of the user can be placed.

Behind the left and right steps 13, rear fenders (also simply referred to as fenders) 14 are disposed so as to cover peripheries of the rear wheels 2 from the front to above the rear wheels 2. The fenders 14 are supported by a pair of left and right stands 15 projecting upward and backward above the rear wheel 2. A length from a right end face of the right fender 14 to a left end face of the left fender 14 is shorter than a length from the right end portion to the left end portion of the handlebar 23, and a maximum width of the vehicle 100 is defined by the handlebar 23.

A connecting plate 16 is interposed between the left and right fenders 14. The connecting plate 16 extends in the left-right direction, and both left and right end portions thereof are fixed to the fenders 14. At a central portion of a rear surface of the connecting plate 16 in the left-right direction, a brake lamp 17 that is turned on when the brake unit 5 is operated is provided. At rear end portions of the left and right fenders 14, a pair of left and right blinker lamps 18 that blink in response to an operation of the blinker switch is provided.

As illustrated in FIG. 1A, the front frame 11 and the rear frame 12 of the main frame 10 are connected via a swing part 30. That is, the front frame 11 is connected to the rear frame 12 via the swing part 30 so as to be swingable in the left-right direction. The swing part 30 includes a Neidhart rubber spring 31 fixed to a bottom surface of the flat plate portion 112 of the front frame 11.

Figure 2:
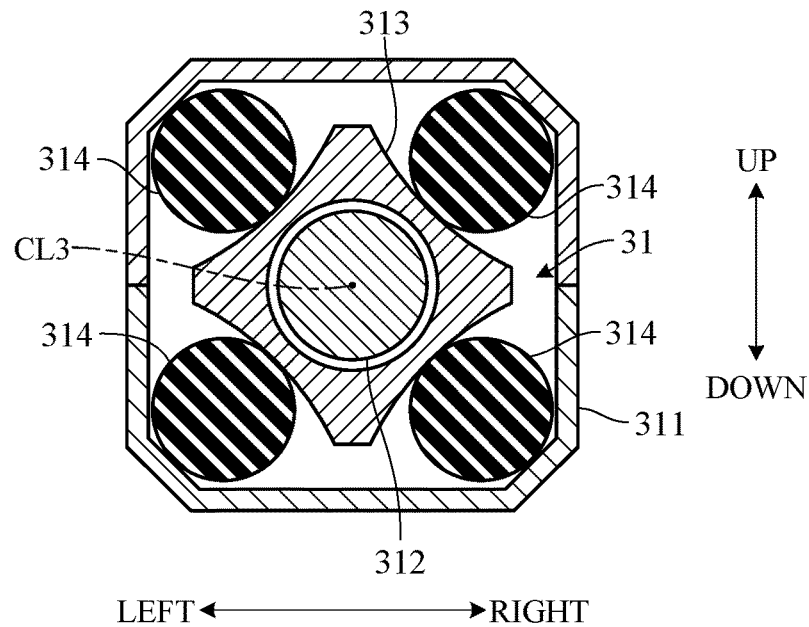
FIG. 2 is a cross-sectional view illustrating a schematic configuration of a Neidhart rubber spring provided in a swing part of the vehicle according to the embodiment of the present invention.

FIG. 2 is a cross-sectional view illustrating a schematic configuration of the Neidhart rubber spring 31 provided in the swing part 30. As illustrated in FIG. 2, the Neidhart rubber spring 31 is incorporated in a case 311 having a substantially rectangular frame shape in a cross section and fixed to the bottom surface of the flat plate portion 112. In the case 311, a shaft 312 which is provided integrally with the central frame 121 of the rear frame 12 and has a substantially circular cross section extending along a center line CL3 of the central frame 121 is disposed. Note that a front end portion of the central frame 121 may be configured to have a substantially circular cross section, and this may be used as the shaft 312. The Neidhart rubber spring 31 includes a substantially rhombic cam block 313 spline-connected to the shaft 312 so as to be rotatable integrally with the shaft 312, and rubber rollers 314 disposed opposite to surfaces formed in a concave shape of the cam block 313.

FIG. 2 illustrates an initial state in which the front frame 11 is not swung. At this time, as illustrated in FIGS. 1A and 1B, the vertical frame 20 is not inclined in the left-right direction, and the vehicle 100 is in a reference posture. When torque acts on the case 311 from this initial state and the case 311 rotates about the center line CL3, the rubber roller 314 is pressed and elastically deformed between the case 311 and the cam block 313, and the rubber roller 314 becomes elliptical. At this time, the front frame 11 swings together with the vertical frame 20, and the vehicle 100 takes an inclined posture. In this case, as a rotation angle of the case 311 increases, a rotational resistance to the case 311 increases. When the torque acting on the case 311 becomes zero, the rubber roller 314 returns to the original shape by the elastic force, and the front frame 11 returns to the reference posture.

As described above, by providing the front frame 11 of the main frame 10 so as to be swingable via the swing part 30, the user riding on the vehicle 100 in a standing posture can easily turn the vehicle 100 in the left-right direction. For example, when turning the vehicle 100 in the left-right direction, the user slightly bends the knees and the ankles and inclines the upper body to the left or right. As a result, the vertical frame can be swung integrally with the front frame 11 in a stable posture with both feet placed on the step 13 while the step 13 integrated with the rear frame 12 is kept horizontal, and the front wheel 1 can be inclined to the left and right. As a result, the vehicle 100 can be smoothly turned, and the turning performance is improved.

In addition, since the Neidhart rubber spring 31 is provided in the swing part 30, when the front frame 11 is swung to the left and right from the reference posture, a restoring force acts on the front frame 11, and swinging of the front frame 11 can be favorably suppressed. The cam block 313 may be formed not in a quadrangular shape but in another polygonal shape (for example, a triangular shape). Instead of forming all surfaces of the cam block 313 in a concave shape, for example, two surfaces may be formed in a concave shape, and the rubber rollers 314 may be disposed to face these concave surfaces. The restoring force may be acted on the front frame 11 by using an elastic member such as a coil spring instead of the Neidhart rubber spring 31. That is, the configuration of a damper member is not limited to the Neidhart rubber spring 31.

Although not illustrated, a load point (a center point of a load acting from a sole) acting on the step 13 by a weight of the user in a standing posture is located in a triangular region connecting a grounding point of the front wheel 1 and the grounding points of the pair of left and right rear wheels 2 in plan view. Thus, the user can ride on the vehicle 100 in a stable posture during both traveling and stopping.

The vehicle 100 according to the present embodiment is provided to be foldable. More specifically, as illustrated in FIG. 1A, the vertical pipe 21 is provided with, above the pipe support portion 113, a rotation support portion 40 that supports an upper part (referred to as an upper pipe portion 211) of the vertical pipe 21 so as to be rotatable backward with respect to a lower part (referred to as a lower pipe portion 212) of the vertical pipe 21.

Figure 3:
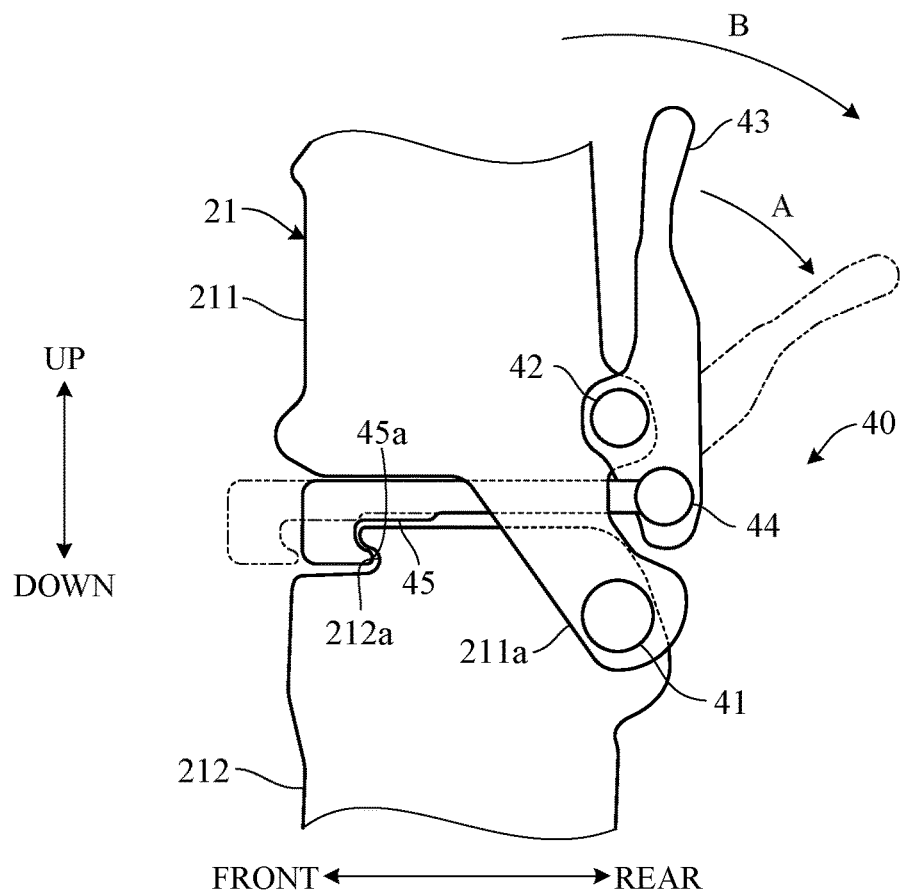
FIG. 3 is a view illustrating a schematic configuration of a rotation support portion of the vehicle according to the embodiment of the present invention.

FIG. 3 is a view illustrating a schematic configuration of the rotation support portion 40. As illustrated in FIG. 3, a bracket 211a is provided to protrude rearward and downward from a lower end portion of the upper pipe portion 211. The bracket 211a is supported by an upper end portion and a rear end portion of the lower pipe portion 212 so as to be rotatable in the front-rear direction with a pin 41 extending in the left-right direction as a fulcrum. Further, at the lower end portion of the upper pipe portion 211, a lever 43 is supported at a rear end portion above the bracket 211a so as to be rotatable in the front-rear direction with a pin 42 extending in the left-right direction as a fulcrum. To a lower end portion of the lever 43, a rear end portion of a rod 45 extending in the front-rear direction with a pin 44 extending in the left-right direction as a fulcrum is connected. The rod 45 is provided to be movable in the front-rear direction between the lower end portion of the upper pipe portion 211 and the upper end portion of the lower pipe portion 212.

On a front end portion of the rod 45, a protrusion 45a to be engaged with an engagement recess 212a provided on a front surface of the upper end portion of the lower pipe portion 212 is provided to protrude rearward. As indicated by a solid line in FIG. 3, in an initial state where the lever 43 is rotated upward so as to approach a rear surface of the upper pipe portion 211, the rod 45 is pulled backward, and the protrusion 45a is engaged with the engagement recess 212a. At this time, rearward rotating of the upper pipe portion 211 about the pin 41 as a fulcrum is prevented (a locked state). Therefore, the vertical pipe 21 is fixed in an erected state along the axis CL2 in FIG. 1A, and the vehicle 100 is in a traveling posture.

As indicated by a two-dot chain line in FIG. 3, when the lever 43 is rotated downward (a direction of an arrow A) from a rotating lock state, the pin 44 moves forward and the rod 45 is pushed forward. As a result, the protrusion 45a of the rod 45 and the engagement recess 212a are disengaged (an unlocked state). As a result, the upper pipe portion 211 is rotatable rearward (in a direction of an arrow B) with the pin 41 as a fulcrum, and the vehicle 100 can be brought into a folded posture.

Figure 4:
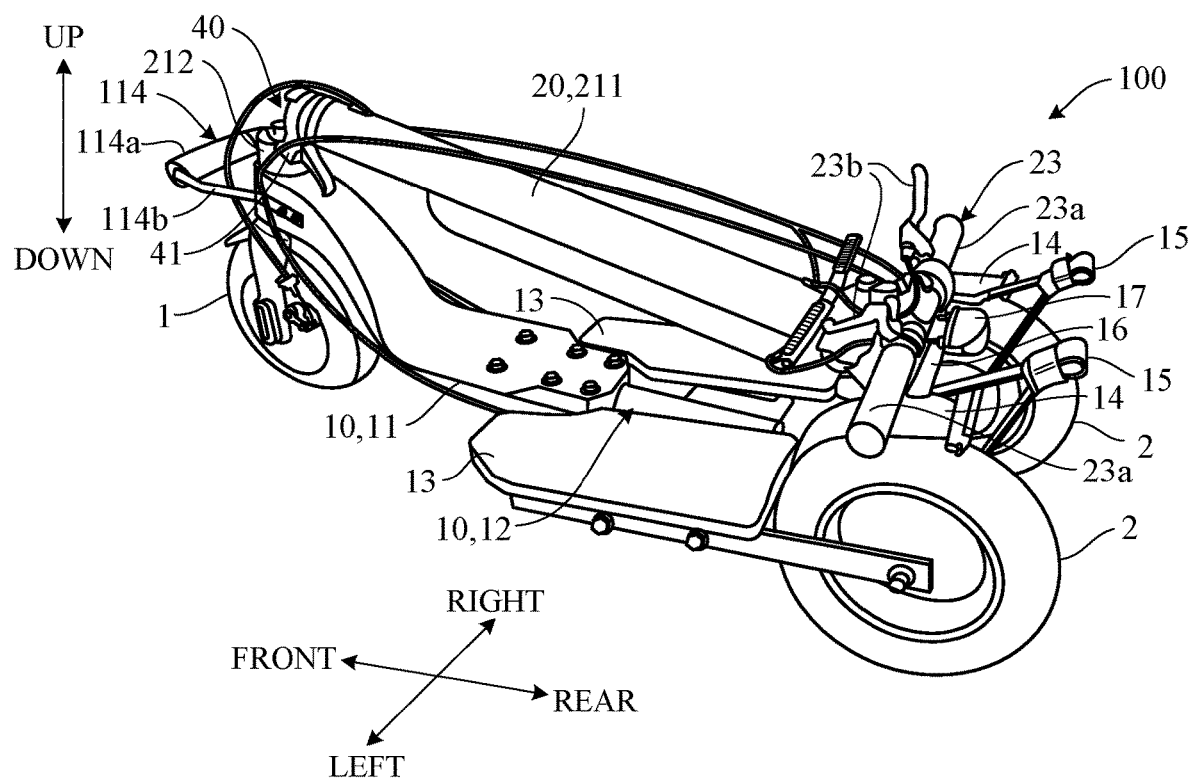
FIG. 4 is a perspective view illustrating a folded posture of the vehicle according to the embodiment of the present invention.

FIG. 4 is a perspective view illustrating an overall configuration of the vehicle 100 in the folded posture. A front-rear direction, a left-right direction, and an up-down direction in FIG. 4 respectively coincide with the directions illustrated in FIGS. 1A and 1B. As illustrated in FIG. 4, in the folded posture, the upper pipe portion 211 is rotated rearward to the maximum with the rotation support portion 40 as a fulcrum, and the upper pipe portion 211 and the main frame 10 (the front frame 11 and the rear frame 12) are substantially parallel to each other. More specifically, the upper pipe portion 211 is inserted between the left and right rear wheels 2, a distal end portion (a rear end portion in FIG. 4) of the upper pipe portion 211 is positioned below a proximal end portion (the pin 41), and the upper pipe portion 211 is inclined with a gentle downward gradient toward the rear side.

At this time, the left and right grips 23*a* are respectively in contact with the upper surfaces of the left and right fenders 14. This makes it possible to prevent the grips 23*a* from being dirty in the folded posture. In addition, while the user grips the grip 23*a* and moves the handlebar 23 to the vicinity of the fenders 14 when the vehicle 100 is brought into the folded posture, the rear wheels 2 are covered with the fenders 14. Therefore, when the vehicle 100 is brought into the folded posture, it is possible to prevent the user's hand from touching a surface of the rear wheel 2. Although not illustrated, the handlebar 23 in the folded posture is connected to the fenders 14, the stand 15, or the connecting plate 16 with a hook member, a binding band, or the like.

A handle 114 is disposed above the front wheel 1. The handle 114 includes a grip portion 114*a* extending in the left-right direction and a pair of left and right stays 114*b* extending rearward from both left and right end portions of the grip portion 114*a*, and has a substantially U-shape as a whole in plan view. A rear end portion of the stay 114*b* is fixed to left and right side surfaces of a front end portion of the front frame 11 with bolts or the like. The vehicle 100 in the folded posture can stand with the rear wheel 2 as a fulcrum to be brought into an upright posture, by holding the handle 114 and lifting the front wheel 1 side upward.

Figure 5:
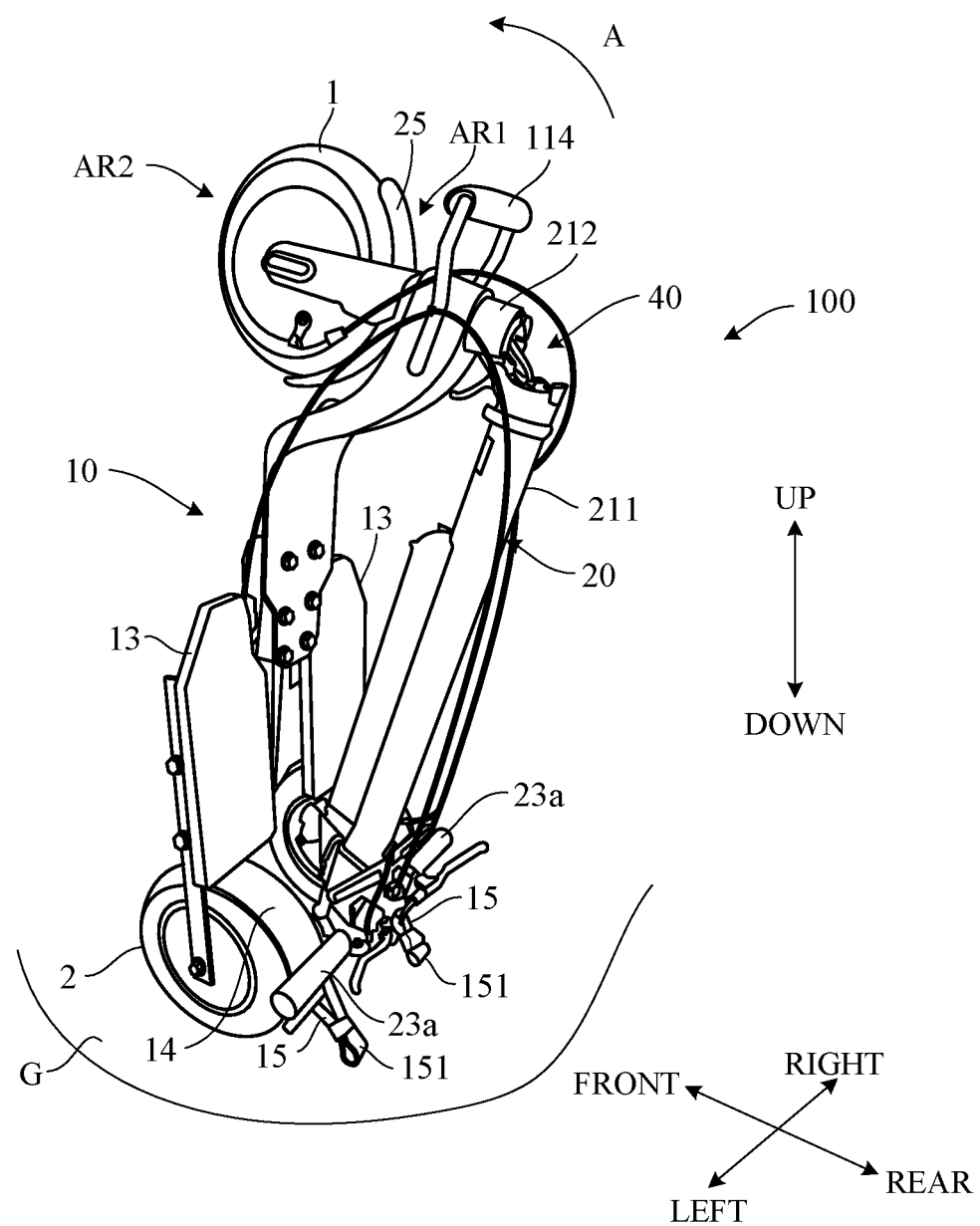
FIG. 5 is a perspective view illustrating an upright posture of the vehicle according to the embodiment of the present invention.

FIG. 5 is a perspective view illustrating an overall configuration of the vehicle 100 in the upright posture. A front-rear direction, a left-right direction, and an up-down direction in FIG. 5 respectively coincide with the directions illustrated in FIGS. 1A and 1B. In the upright posture, the vehicle 100 is in a folded state, and the upright posture is included in the folded posture. As illustrated in FIG. 5, in the upright posture, the left and right rear wheels 2 and the distal end portions (grounding portions 151) of the left and right stands 15 behind the rear wheels 2 are grounded to a ground G, and the vehicle 100 is upright with four-point support. At this time, the main frame 10 stands substantially vertically, and the front wheel 1 is positioned vertically above the rear wheel 2. Whereas, the vertical frame 20 is located behind the main frame 10, and a center of gravity of the vehicle 100 is behind a grounding position of the rear wheels 2. Therefore, by providing the stand 15 protruding behind the rear wheels 2 as illustrated in the figure, the vehicle 100 can be stably held in the upright posture.

When carrying the vehicle 100, the user grips the handle 114 of the vehicle 100 in the upright posture and inclines the vehicle 100 forward (in the direction of an arrow A) with the rear wheel 2 as a fulcrum. This separates the grounding portion 151 of the stand 15 from the ground G, and the user can easily carry the vehicle 100 forward while rolling the rear wheel 2. Note that, in FIG. 5, in an outer peripheral surface of the front wheel 1, a region covered with the fender 25 is referred to as a first region AR1, and a region exposed from the fender 25 is referred to as a second region AR2.

Figure 6:
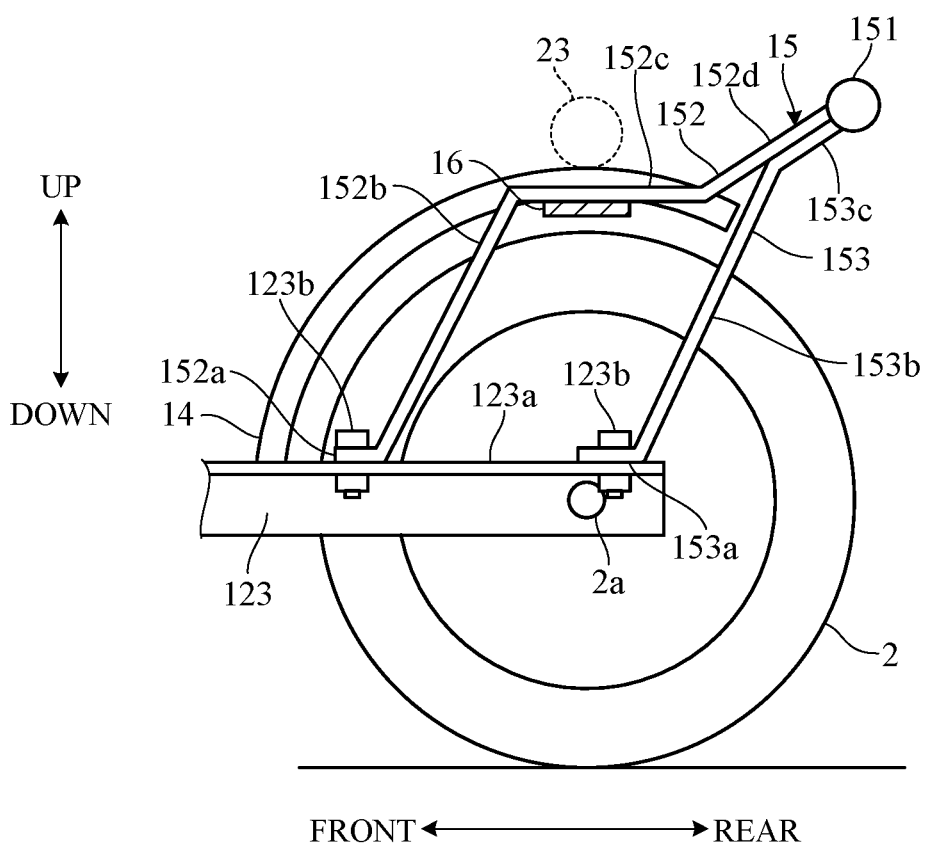
FIG. 6 is a side view of a rear wheel of the vehicle according to the embodiment of the present invention seen from inside of a vehicle width direction.
Figure 7:
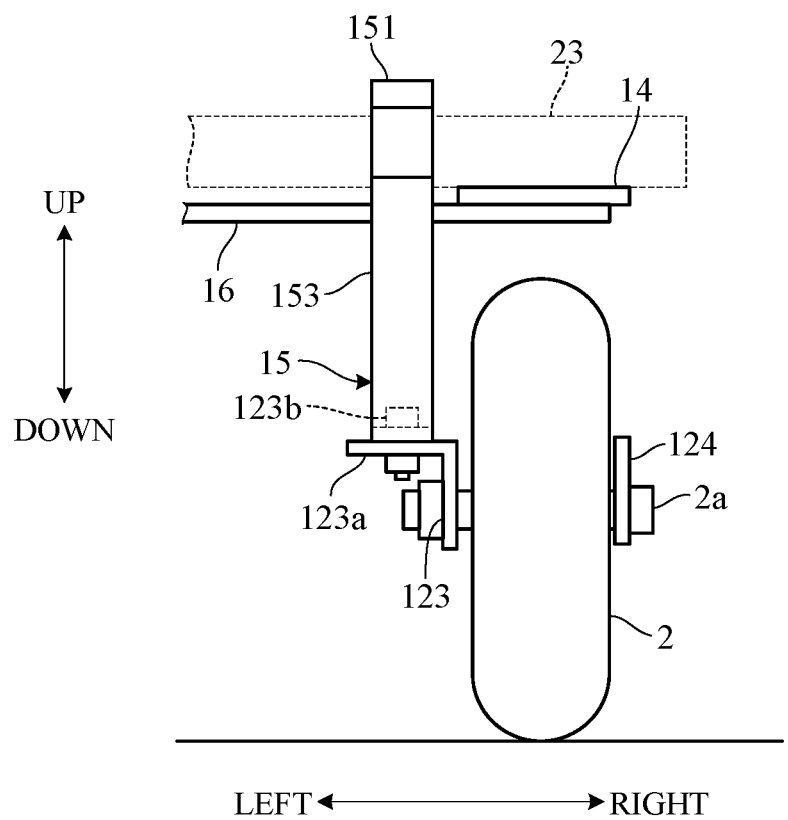
FIG. 7 is a rear view of a rear wheel of the vehicle according to the embodiment of the present invention seen from rear.

Configurations of the fenders 14 and the stand 15 of the rear wheel 2 will be described in detail. FIGS. 6 and 7 are a side view and a rear view, respectively, schematically illustrating a configuration of a main part around the rear wheel 2 (the right rear wheel 2). FIG. 6 is a side view of the right rear wheel 2 as viewed from inside (the left side) in the left-right direction. In FIGS. 6 and 7, a position of the handlebar 23 in the folded posture is indicated by a dotted line.

As illustrated in FIGS. 6 and 7, an upper portion of the inner side frame 123 is bent at a substantially right angle toward inside in the left-right direction, and a flange portion 123*a* having a flat upper surface is formed in the inner side frame 123. The stand includes a pair of front and rear flat plates having a predetermined width in the left-right direction, that is, a front plate 152 and a rear plate 153. The front plate 152 and the rear plate 153 are formed by bending into predetermined shapes.

More specifically, as illustrated in FIG. 6, the rear plate 153 includes a flange plate portion 153*a*, an inclined plate portion 153*b* and a joining plate portion 153*c*. The flange plate portion 153*a* is fastened to a rear end portion of the flange portion 123*a* in the vicinity of the rotary shaft 2*a* of the rear wheel 2 via a bolt 123*b*. The inclined plate portion 153*b* extends obliquely upward and backward at a first inclination angle with respect to a horizontal line from a rear end of the flange plate portion 153*a*. The joining plate portion 153*c* extends obliquely upward and backward from an upper end of the inclined plate portion 153*b* at a second inclination angle smaller than the first inclination angle. The front plate 152 includes a flange plate portion 152*a*, an inclined plate portion 152*b*, a horizontal plate portion 152*c*, and a joining plate portion 152*d*. The flange plate portion 152*a* is fastened to the flange portion 123*a* via the bolt 123*b* on the front side of the rotary shaft 2*a* of the rear wheel 2 and on the rear side of the front end portion of the fender 14. The inclined plate portion 152*b* extends obliquely upward and backward substantially in parallel with the inclined plate portion 153*b* from a rear end of the flange plate portion 152*a*. The horizontal plate portion 152*c* extends rearward in a substantially horizontal direction from a rear end (upper end) of the inclined plate portion 152*b* above an upper end surface of the rear wheel 2. The joining plate portion 152*d* extends obliquely upward and backward substantially in parallel with the joining plate portion 153*c* from a rear end of the horizontal plate portion 152*c*. The joining plate portion 152*d* and the joining plate portion 153*c* are joined to each other, and the grounding portion 151 having a substantially circular cross section is formed at an end portion thereof.

As illustrated in FIGS. 6 and 7, an upper surface of the connecting plate 16 is joined to a bottom surface of the horizontal plate portion 152*c* of the front plate 152 by welding or the like at substantially the same position as the rotary shaft 2*a* in the front-rear direction. A bottom surface of the fender 14, more specifically, a bottom surface of an uppermost portion of the fender 14 is joined to left and right end portions of the connecting plate 16 by welding or the like. Thus, the fender 14 is supported from the inner side frame 123 via the connecting plate 16 and the stand 15.

When the vehicle 100 is in the folded posture, the handlebar 23 (a dotted line) is located above the rotary shaft 2*a*. Above the rotary shaft 2*a* (on a vertical cross section including the rotary shaft 2*a*), an upper surface of the stand 15 (the horizontal plate portion 152*c*) is positioned below an upper surface of the fender 14. Therefore, as illustrated in FIGS. 6 and 7, in the folded posture, the handlebar 23 comes into contact with the upper surface of the fender 14 having a substantially arc shape, which can prevent the handlebar 23 from coming into contact with the rear wheel 2. This point will be described from the viewpoint of a rotation angle of the vertical frame 20 (the upper pipe portion 211) in the folded posture.

Figure 8:
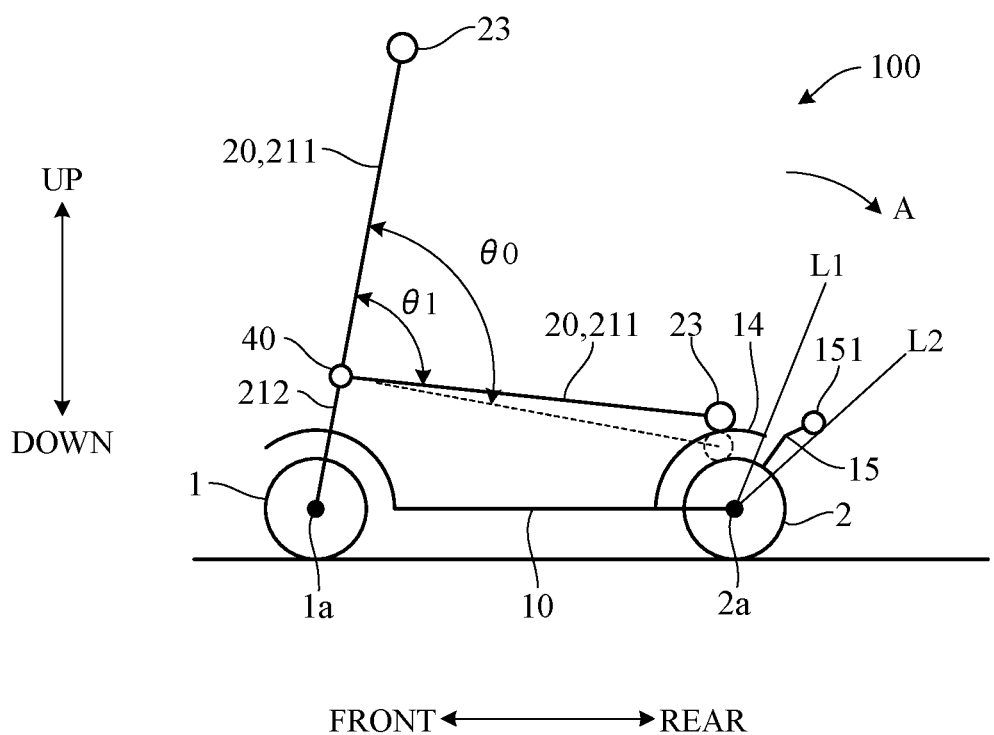
FIG. 8 is a side view of the vehicle schematically illustrating a rotation angle of a vertical frame when the vehicle changes from a traveling posture to the folded posture.

FIG. 8 is a side view of the vehicle 100 schematically illustrating a rotation angle of the vertical frame 20 when the vehicle 100 changes from the traveling posture to the folded posture. As indicated by a dotted line in FIG. 8, when the upper pipe portion 211 of the vertical frame 20 is rotated rearward with the rotation support portion 40 as a fulcrum, the rotation angle at which the handlebar 23 comes into contact with the rear wheel 2 is θ0. In the present embodiment, as indicated by a solid line in FIG. 8, the rotating of the vertical frame 20 is restricted by the fenders 14. Therefore, the rotation angle is θ1 smaller than θ0. This makes it possible to prevent the handlebar 23 from coming into contact with the rear wheel 2 in the folded posture.

In FIG. 8, a line segment (a first line segment) L1 connecting the rotary shaft 2a of the rear wheel 2 and a rear end of the fender 14 is located on the front side of a line segment (a second line segment) L2 connecting the rotary shaft 2a and a rear end of the stand 15 (a rear end of the grounding portion 151). Therefore, after the vehicle 100 is brought into the folded posture, when the vehicle 100 is rotated in a direction of an arrow A with the rear wheel 2 as a fulcrum to bring the vehicle 100 into the upright posture (FIG. 5), the grounding portion 151 is grounded earlier than the fenders 14. Therefore, the vehicle 100 can be held in the stable upright posture via the stand 15.

According to the present embodiment, the following operations and effects can be achieved.

(1) The vehicle 100 according to the present embodiment is configured to be capable of changing a posture thereof between the traveling posture and the folded posture obtained by folding from the traveling posture (FIG. 1A, FIG. 4). The vehicle 100 includes: the front wheel 1 and the rear wheels 2; the main frame 10 extending in the front-rear direction from the front wheel 1 to the rear wheels 2; the vertical frame 20; the handlebar 23 supported by the vertical frame 20; the rotation support portion 40 that rotatably supports the upper pipe portion 211 together with the handlebar 23 about the pin 41 so that the handlebar 23 is arranged above the front wheel 1 during the traveling posture of the vehicle 100 and the handlebar 23 is arranged above the rear wheels 2 during the folded posture; and the fenders 14 that are provided near the rear wheels 2 and restrict approach of the handlebar 23 to the rear wheels 2 when the vehicle 100 changes from the traveling posture to the folded posture (FIG. 1A, FIG. 4).

This makes it possible to prevent the handlebar 23 from coming into contact with the rear wheels 2 when the vehicle 100 is brought into the folded posture. Therefore, when the vehicle 100 returns from the folded posture to the traveling posture, the user can immediately ride on the vehicle 100 without making a hand dirty. When the vehicle 100 is brought into the folded posture, the user brings a hand close to the rear wheel 2 while holding the handlebar 23. However, also in this case, it is possible to prevent the user's hand from getting dirty and it is easy to fold the vehicle 100 since the fender 14 is provided around the rear wheel 2. Since the fender 14 functions as a movement restriction portion that restricts a movement of the handlebar 23, it is not necessary to separately provide the movement restriction portion, and an increase in the number of components can be suppressed.

(2) The vehicle 100 further includes the stand 15 that is provided on the main frame 10 and holds the vehicle 100 to be brought into the upright posture in which the front wheel 1 is positioned above the rear wheel 2 while the vehicle 100 is folded (FIG. 5). The fender 14 is supported by the stand 15 (FIGS. 6 and 7). As a result, rigidity of the fender 14 can be increased, and the fender 14 can be prevented from being deformed when the handlebar 23 comes into contact with the fender. Since the vehicle 100 is upright while being in the folded posture via the stand 15, the vehicle 100 can be easily stored in a space-saving manner.

(3) The stand 15 has the grounding portion 151 that is grounded when the vehicle 100 is in the upright posture (FIG. 5). The grounding portion 151 is provided such that the line segment L1 connecting the rotary shaft 2a of the rear wheel 2 and the rear end portion of the fender 14 is located on the front side of the line segment L2 connecting the rotary shaft 2a and the grounding portion 151 (FIG. 8). This allows the vehicle 100 to be upright with the fenders 14 separating from the ground, which can prevent damage to the fender 14.

(4) The rear wheels 2 are a pair of left and right rear wheels 2 (FIG. 1A). The fender 14 is disposed around each of the pair of left and right rear wheels 2 (FIG. 1A). As a result, the left and right grips 23a of the handlebar 23 can be stably supported by the pair of left and right fenders 14 in a well-balanced manner when the vehicle 100 is in the folded posture.

(5) The rotation support portion 40 is provided on the vertical frame 20 above the main frame 10 so that the upper pipe portion 211, which is a part of the vertical frame is rotatable (FIG. 1A). The vertical frame 20 is inserted between the pair of left and right rear wheels 2 when the vehicle 100 is in the folded posture (FIG. 4). As a result, since a projection of the vertical frame 20 is suppressed in the folded posture, the vehicle 100 can be folded compactly.

Figure 9A:
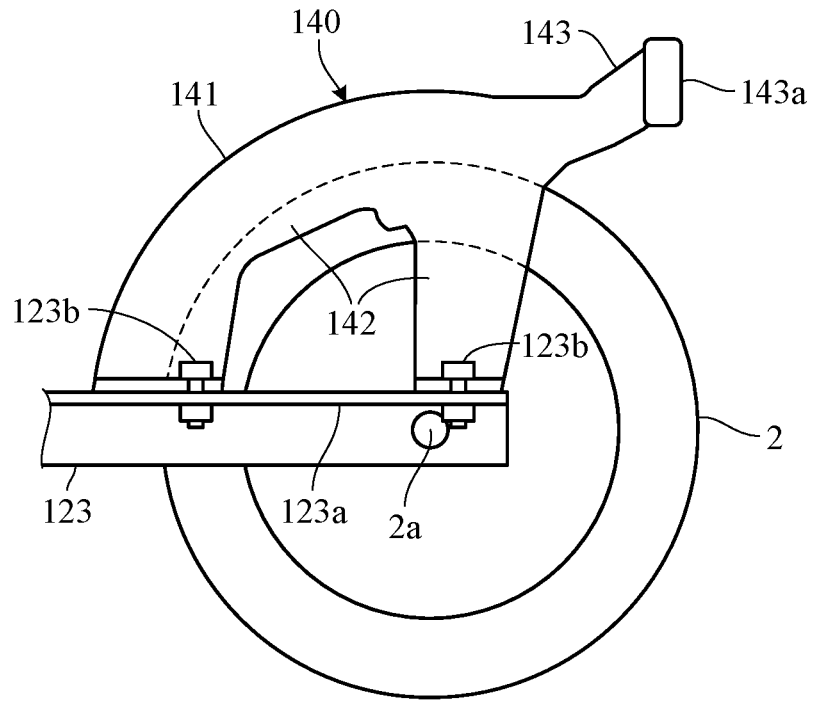
FIG. 9A is a view illustrating a modification of FIG. 6.

The above embodiment can be varied into various forms. Some variations will be described below. In the above embodiment, the fender 14 is supported by the stand 15. However, the fender may also function as the stand. FIG. 9A is a side view (of the right rear wheel 2 viewed from the inside of the vehicle width direction) of a main part of the vehicle 100 showing an example of this, and FIG. 9B is a rear view.

Figure 9B:
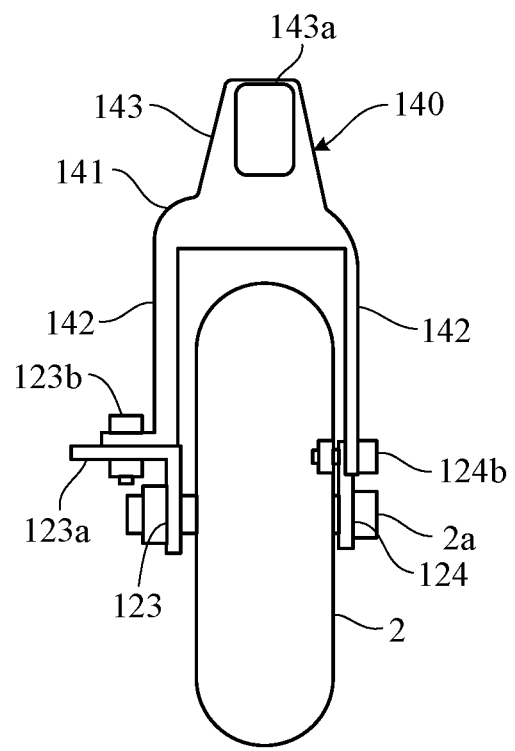
FIG. 9B is a view illustrating a modification of FIG. 7.

As illustrated in FIGS. 9A and 9B, the fender 140 arranged around the rear wheel 2 has a substantially arc-shaped peripheral wall 141 that faces the outer peripheral surface of the rear wheel 2 and a pair of front and rear brackets 142 extended from end portions of the left and right sides of the peripheral wall 141 to face the left and right side surfaces of the rear wheel 2, respectively. The bottoms of the pair of front and rear brackets 142 on the inner side in the vehicle width direction are fastened to the flange portion 123a of the inner side frame 123 by bolts 123b. The lower ends of the pair of front and rear brackets 142 on the outer side in the vehicle width direction are fastened to the outer side frame 124 by bolts 124b. Since the fender 14 is supported by the left and right side frames 123 and 124 via the left and right brackets 142, the support rigidity of the fender 14 is increased, and the fender 14 can be firmly supported.

The fender 140 further includes a stand portion 143 protruding rearward and upward from the rear end of the peripheral wall 141. A grounding portion 143a is provided at the rear end of the stand portion 143. Note that the grounding portion 143a can be formed of an elastic material. By grounding the grounding portion 143a of the stand portion 143, as shown in FIG. 5, the vehicle 100 can be maintained in the upright posture. By configuring the fender 140 to have a function as a stand, the number of components is reduced, and the assembly of the vehicle 100 is made easier.

In the above embodiment, the vertical frame 20 as a second frame is rotatably supported with respect to the main frame 10 as a first frame by operating the handlebar 23 as a steering part. However, the configuration of the first frame, the second frame, and the steering part is not limited to those described above. For example, the first frame may be configured to be foldable with a shaft portion extending in the width direction of the vehicle as a fulcrum. That is, as long as it extends substantially horizontal direction in the traveling posture and forms a skeleton that serves as the base of the vehicle, the configuration of the first frame can be any. Here, "substantially horizontal direction" means an angle of the line segment connecting the front end portion (e.g. the front end portion of the front frame 11) and the rear end portions (e.g. the rear end portions of the side frames 123 and 124) of the first frame with respect to the horizontal line is equal to or less than a predetermined value (e.g. 30°).

In the above embodiment, the upper pipe portion 211 of the vertical pipe 21 is rotatably supported about the pin 41 through the rotation support portion 40 provided on the vertical pipe 21. However, the configuration of a support portion is not limited to this. That is, as long as movably supporting the handlebar 23 about a pivot axis so that the handlebar 23 is arranged above the front wheel 1 in the traveling posture and above the rear wheel 2 in the folded posture, the support portion may be any configuration. In the above embodiment, the pin 41 as a pivot axis is provided above the main frame 10, but the position of the pivot axis is not limited to this.

In the above embodiment, fenders 14 arranged around the rear wheels 2 are used to restrict the approach movement of the handlebar 23 to the rear wheels 2 in the folded posture. However, as long as the movement of handlebar 23 towards the rear wheels 2 is restricted when transitioning from the traveling posture to the folded posture, the configuration of a movement restriction portion is not limited to this. For example, it may be possible to restrict the movement of the handlebar 23 by using the stand 15 or the connecting plate 16. That is, a part of the stand 15 or the connecting plate 16 may be in contact with the handlebar 23. In other words, it may be possible to restrict the movement of handlebar 23 using a fender support portion that supports fender 14. The fender support portion may be configured using something other than the stand 15 or the connecting plate 16.

Figure 10:
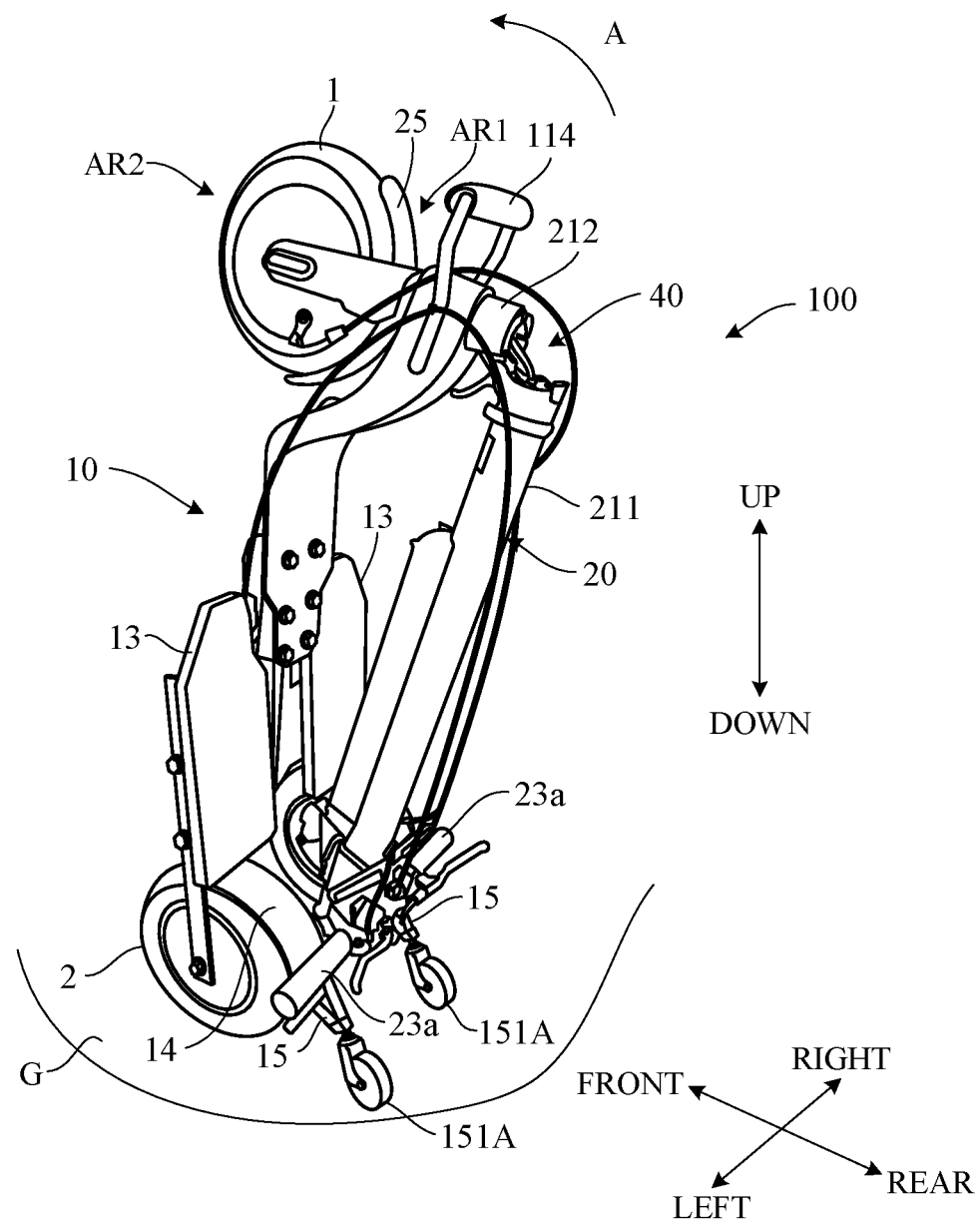
FIG. 10 is a view illustrating a modification of FIG. 5.

In the above embodiment, a pair of left and right stands 15 are provided on the inside of the left and right rear wheels 2 to support vehicle 100 by the stands 15 in the upright posture. However, stands may be provided on the outside of the left and right rear wheels 2. A single stand may also be provided in the central portion of the left and right directions of vehicle 100. The configuration of the grounding portion 151 at the distal end portion of the stand 15 is not limited to the above embodiment. For example, as illustrated in FIG. 10, which is a modification of FIG. 5, a small swiveling wheel such as caster 151A may be provided at the distal end portion of stand 15. This makes it possible to move the vehicle 100 while keeping the grounding portion (the caster 151A) in contact with the ground, making it easier to move the vehicle 100. In the above embodiment, the vehicle 100 is configured to have a single front wheel 1 and a pair of left and right rear wheels 2. However, the vehicle can be configured to have a single front wheel and a single rear wheel, or a pair of front wheels and a single rear wheel. The single front wheel includes, for example, a pair of front wheels included in one position, that is, pair front wheels.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LOST 1 front wheel, 2 rear wheel, 10 main frame, 14 fender, 15 stand, 16 connecting plate, 20 vertical frame, 23 handlebar, 40 rotation support portion, 41 pin, 100 vehicle, 151 grounding portion, L1,L2 line segment

The invention claimed is:

1. A vehicle configured to be capable of changing a posture between a traveling posture and a folded posture obtained by folding from the traveling posture, comprising:
a front wheel arranged on a center line extending in a front-rear direction;
a pair of left and right rear wheels arranged on both sides in a left-right direction of the center line;
a first frame extending in the front-rear direction from the front wheel to the pair of left and right rear wheels and having a front frame and a rear frame;
a second frame;
a steering part supported by the second frame;
a connecting part configured to swingably connect the front frame and the rear frame in the left-right direction about an axial line extending in the front-rear direction;
a support portion configured to movably support the steering part about a pivot axis so that the steering part is positioned above the front wheel when the vehicle is in the traveling posture and the steering part is positioned above the pair of left and right rear wheels when the vehicle is in the folded posture; and
a movement restriction portion provided near the pair of left and right rear wheels so as to restrict a movement of the steering part toward the pair of left and right rear wheels when the posture of the vehicle changes from the traveling posture to the folded posture through a contact of the steering part on both sides in the left-right direction of axial line.

2. The vehicle according to claim 1, wherein
the movement restriction portion is a fender arranged around the pair of left and right rear wheels or a fender support portion supporting the fender.

3. The vehicle according to claim 2, further comprising
a stand provided on the first frame to hold the vehicle in an upright posture where the front wheel is positioned above the pair of left and right rear wheels while the vehicle is folded, wherein
the fender support portion is the stand.

4. The vehicle according to claim 3, wherein
the stand includes a grounding portion grounding when the vehicle is in the upright posture, and
the grounding portion is provided so that a first line segment connecting a rotation axis of the pair of left and right rear wheels and a rear end of the fender is positioned forward of a second line segment connecting the rotation axis and the grounding portion when the vehicle is in the traveling posture.

5. The vehicle according to claim 2, wherein
the fender includes a pair of fenders disposed around the pair of left and right rear wheels.

6. The vehicle according to claim 5, wherein
the pivot axis is provided on the second frame above the first frame so that a part of the second frame is rotatable, and
the second frame is inserted and disposed between the pair of left and right rear wheels when the vehicle is in the folded posture.

7. The vehicle according to claim 6, further comprising:
an electric motor driving the front wheel; and
a battery supplying an electric power to the electric motor, wherein
the battery is disposed between the first frame and the second frame when the vehicle is in the folded posture.

8. The vehicle according to claim 1, further comprising
a pair of left and right placement parts supported by the first frame so that feet of an occupant are placed thereon.

* * * * *